UNITED STATES PATENT OFFICE.

HERMAN E. BROWN, OF KINGSTON, NEW YORK.

PROCESS OF OBTAINING ALKALI-METAL COMPOUNDS.

1,123,841. Specification of Letters Patent. Patented Jan. 5, 1915.

No Drawing. Application filed April 30, 1914. Serial No. 835,415.

*To all whom it may concern:*

Be it known that I, HERMAN E. BROWN, a citizen of the United States, and a resident of Kingston, county of Ulster, State of New York, have invented certain new and useful Improvements in Processes of Obtaining Alkali-Metal Compounds, of which the following is a specification.

My invention relates to improvements in processes for obtaining alkali metal compounds and more particularly to the obtaining of such compounds from the double silicates of potassium and aluminum or equivalent materials and at the same time obtaining valuable by-products.

One object of the invention is to provide a process for these purposes which requires a relatively small fuel consumption and is economical, a process in which there need be no cessation of operation and in which the potash may be obtained rapidly and with a large percentage yield.

In carrying out my process in the preferred form, I take feldspar and fuse it in a suitable furnace in an oxidizing atmosphere with a sufficient quantity of calcium chlorid to furnish sufficient chlorin to combine with the potassium in the feldspar and with a sufficient quantity of calcium carbonate to bring the calcium oxid content in the resulting material up to between 40 per cent. and 55 per cent. In this respect magnesia is to a certain extent the equivalent of lime, so that whenever I speak of the lime content being between 40% and 55%, or about 50%, I mean lime or its equivalent. Using this proportion of lime, I am enabled to flux or melt the mix at a temperature of about 1300° C., thus obtaining low heat consumption. The calcium chlorid combines with the potassium or other alkali in the silicate forming potassium or alkaline chlorid, which is volatilized and may be collected by suitable well known condensing apparatus. The resulting material may be of about the following composition:

| | |
|---|---|
| Silica | 35 per cent. |
| Alumina | 10 " " |
| Calcium oxid | 52 " " |
| Remainder | 3 " " |

The fusion preferably takes place in an oxidizing atmosphere in the furnace, at least the atmosphere should be substantially non-reducing so that any metal in the double silicates will not be reduced and plug up the furnace.

In order to obtain as much of value from the process as possible, the fused material resulting after the volatilization of the potash, may be treated in any well known or suitable way to make slag brick, fillers for concrete mixtures, glass wool, silicate roofing materials, hydraulic cement or other silicate product as by-products. For instance, an advantageous by-product is hydraulic cement which can be readily made by the combination of certain steps with those above described so that a continuation of the process will produce a by-product of very considerable value. For this purpose the fused material is allowed to run from the furnace either directly or from a ladle, preferably onto a rotary drum, so that it is distributed in finely divided particles in a chamber filled with a spray of an aqueous solution of magnesium sulfate. The magnesium sulfate being an aqueous solution (say in a 5 per cent. solution) and coming into contact with the particles of the melted material, the water of the solution is quickly evaporated, thereby breaking up the product as it cools. This action or second step produces marked changes in the chemical and physical character of the fused silicates, resulting in a high grade hydraulic cement.

The terms fusion, fused and equivalent expressions in this application, mean nothing less than a completely liquid melted product and are distinct from the terms clinkered or incipient fusion, as sometimes used in furnace operation.

Instead of using calcium chlorid, any cheap halogen salt may be substituted, or salts capable of furnishing a combining element or elements and forming thus an easily volatilizable compound of potassium or other alkali metal, and instead of using calcium carbonate, any other suitable calcareous material may be used which will increase the calcium oxid content of the resulting product to the proper percentage. Likewise, other suitable water soluble salts of the alkaline earth metals may be injected into the hot material in the second step of the process in making cement and in some cases other materials such as iron salts, alkali metal salts, etc., may be used, the idea being that in the second stage of the process the necessary ingredients are added in order to produce a hydraulic cement, which ingredients vary, according to the nature of the base material operated upon, and the particular kind or quality of hydraulic cement desired.

The second step of the process changes the character of the melted material and renders it suitable for production of a hydraulic cement, because the salt in liquid form coming into contact with the hot product, causes the changes essential in producing a material which exhibits after being ground the physical characteristics of a hydraulic cement. To this product is subsequently added a sufficient amount of plaster or gypsum in order to produce the desired time of set in the cement.

Instead of using the calcium chlorid above mentioned, calcium carbonate alone may be used in the first step of the process. Thus if a double silicate of potassium and aluminum be taken having substantially the following composition, Silica _____ 65%
Alumina _____ 18%
Potassium oxid _____ 14% and traces of ferric sodium, calcium and magnesium oxid, and these materials combined with a comparatively pure limestone or marble in proportion of 100 parts of the double silicate to 170 parts of the calcium carbonate, a fused product is produced of about the following composition:

Silica _____ 35%
Alumina _____ 10%
Calcium oxid _____ 52%
Remainder _____ 3%

These materials melt very easily, and at a temperature of 200° to 300° centigrade lower than is required for the manufacture of Portland cement, that is, a temperature of about 1300° C. This renders their furnacing a comparatively simple matter, the materials being quarried and crushed to approximately the sizes required for blast furnace operation, though if desired they may be coarsely crushed through rolls and treated in a shaft furnace. When the materials are fused the alkali metal oxid is volatilized and combines with excess of carbon dioxid to form potassium carbonate which may be condensed in the flues and saved by any suitable well known mechanical construction of the furnace which cools the escaping gases.

If cement is being made and the materials are combined in the proportions as last stated, for every 100 pounds of orthoclase it is possible, if full recovery of all the potash is made, to secure 24.7 pounds of potassium carbonate. Every barrel of cement would require approximately 200 pounds of orthoclase if allowances are made for impurities in the limestone and for additions of ash, and for magnesium sulfate and gypsum which may be added in the second step; therefore, for every barrel of hydraulic cement produced from such materials, it would be possible, if full recovery is made, to obtain 49.5 pounds of potassium carbonate.

By carrying out the melting or fusion of the materials in an oxidizing or non-reducing atmosphere several advantages are obtained. Not only is the potash given off much more quickly but much more completely. Furthermore, this also promotes greater economy as less fuel consumption is required and the production of separated metals is prevented which would plug up the furnace, causing at least a periodic cessation of operation, and also producing a harmful influence on the resulting composition of melted materials.

By using the stated proportions of CaO to acidic constituents and fusing the mixture instead of subjecting it to mere calcination, practically all of the potash is easily given off and recovered, whereas with calcination approximately one-half of the potash would remain in the calcined constituents. The fusion in this manner also promotes economy in that less fuel consumption is required.

It will be understood that various calcareous materials may be used in the fusion of the silicious material, although calcium carbonate, except as to the special salt used to unite with the potash, is preferred. Calcium sulfate, for instance, may be used but it is not so satisfactory, because $SO_3$ is liberated only at a comparatively higher temperature, and it is more difficult to make a cement when using this mineral.

By the use of my improved process orthoclase, potassium or other alkaline silicate rocks or other silicious material may be used for the production of a hydraulic cement, and at the same time give a relatively higher percentage of volatilized potash or other alkali, than has been possible to obtain from any previous process in furnace treatment of which I am aware.

Although I have described my improvements in great detail and with respect to certain particular embodiments thereof, nevertheless I do not desire to be limited to such details as clearly specified in the appended claims, since many changes and modifications may be made, without departing from the spirit and scope of my invention in its broader aspects.

Having fully and clearly described my improvements, what I claim as new and desire to secure by Letters Patent, is:

1. The process of obtaining alkali metal compounds from alkali metal bearing silicious material, which consists in fusing the material at about 1300° C. with calcareous material in a non-reducing atmosphere to volatilize the alkali metal compound or compounds and collecting the volatilized alkali compound or compounds.

2. The process of obtaining alkali metal compounds from alkali metal bearing silicious material which consists in fusing the material in a non-reducing atmosphere with a sufficient quantity of calcareous material to bring the calcium oxid content of the resulting fused material up to between 40% and 55%, to volatilize the alkali metal compound or compounds and collecting the volatilized alkali metal compound or compounds.

3. The process of obtaining alkali metal compounds from alkali metal bearing silicious material, which consists in fusing the material with calcareous material with a sufficient quantity of calcareous material to bring the calcium oxid content of the resulting fused material up to about 50%, to volatilize the alkali metal compound or compounds and collecting the volatilized alkali compound or compounds.

4. The process of obtaining potash from feldspar, which consists in fusing feldspar in a non-reducing atmosphere with a sufficient quantity of calcium chlorid to furnish combinable chlorin for all the potassium and a sufficient quantity of calcium carbonate to bring the calcium oxid content of the resulting fused material up to between 40% and 55%, and collecting the volatile potash salt.

5. The process of obtaining potash from feldspar, which consists in fusing the feldspar in an oxidizing atmosphere with a sufficient quantity of a halogen salt to furnish substantially one chemical equivalent of the halogen to combine with each chemical equivalent of the potassium and a sufficient quantity of calcium salt to bring the calcium oxid content of the resulting material up to between 40% and 55%, and collecting the volatile potash salt.

6. The process of obtaining alkaline compounds, from alkali bearing silicates, which consists in fusing the silicious material in a non-reducing atmosphere, with a sufficient quantity of a halogen salt to furnish substantially one chemical equivalent of the halogen to combine with each chemical equivalent of the alkali metal and a sufficient quantity of a calcium salt to bring the calcium oxid content of the resulting product up to between 40% and 55%, and collecting the alkali salt.

7. The process of obtaining potash from potash bearing silicates, which consists in fusing the silicious material in a non-reducing atmosphere at about 1300° C. with a sufficient quantity of a halogen salt, which supplies the required amount of halogen to combine with the potassium, and with a calcium compound, and collecting the potash salt.

8. The process of obtaining potash from potash and aluminum bearing silicious material, which consists in fusing the silicious material in an oxidizing atmosphere with calcareous material to combine with the potash and bring the calcium oxid content of the resultant fused material up to between 40% and 55%, and recovering the volatilized potash salt.

9. The process of producing potash salts from potassium bearing silicious material, which consists in fusing it with a sufficient quantity of halogen salt to furnish halogen, to combine with all the potassium and with calcium carbonate, and collecting the volatile potassium halogen salt.

10. The process of producing alkali metal salts from alkali bearing silicious material, which consists in fusing it with a sufficient quantity of a halogen salt to furnish halogen to combine with all the alkali metal, and with a sufficient quantity of calcareous material to bring the calcium oxid content of the resulting fused mass up to about 50%, to reduce the temperature of fusion and collecting the volatile alkali metal salts.

In testimony whereof, I have signed my name to this specification, in the presence of two subscribing witnesses.

HERMAN E. BROWN.

Witnesses:
GORHAM CROSBY,
EDWIN SEGER.